United States Patent
Ramirez de Arellano

(10) Patent No.: US 6,547,873 B1
(45) Date of Patent: Apr. 15, 2003

(54) CONCENTRATED ONE-COAT MORTAR, METHOD FOR MAKING THE SAME, AND METHOD FOR APPLYING THE SAME

(76) Inventor: Eduardo Ramirez de Arellano, P.O. Box 6451, Mayagüez, PR (US) 00681

( * ) Notice: Subject to any disclaimer, the term of this patent is extended or adjusted under 35 U.S.C. 154(b) by 0 days.

(21) Appl. No.: 10/153,965

(22) Filed: May 23, 2002

(51) Int. Cl.$^7$ ................................................ C04B 14/28
(52) U.S. Cl. ...................... 106/724; 106/726; 106/730; 106/731; 106/738; 106/805
(58) Field of Search ................................. 106/724, 726, 106/730, 731, 738, 805

(56) References Cited

U.S. PATENT DOCUMENTS 4,229,225 A * 10/1980 Kraszewski et al.

* cited by examiner

*Primary Examiner*—Paul Marcantoni
(74) *Attorney, Agent, or Firm*—Patent Law Offices of Heath W. Hoglund

(57) ABSTRACT

A concentrated one-coat mortar prepared for the application on a concrete based surface on the exterior or interior of a concrete building or other structure. The mortar is especially suited for application in high and low humidity and high and low temperature environments. As the mortar dries, its composition prevents the formation of cracks that commonly occur in commercially available mortars.

8 Claims, No Drawings

CONCENTRATED ONE-COAT MORTAR, METHOD FOR MAKING THE SAME, AND METHOD FOR APPLYING THE SAME

FIELD OF THE INVENTION

The invention relates to a concentrated one-coat mortar, and more specifically to a concentrated one-coat mortar suitable to add with cement and with light sand or its equivalent and finally to be mixed with water in proportions that provide for an even application (smooth or textured). The invention further relates to a concentrated one-coat mortar that avoids cracking through a wide range of temperatures and humidities while forming a monolithic surface.

BACKGROUND

Concrete-based materials are widely used on buildings or other structures to provide an even exterior surface. The concrete-based materials are spread over a rough concrete surface. Such rough concrete surfaces typically include bricks, blocks or stones that are held together by a cement (or concrete).

The application of a coat of mortar involves first preparing the mortar. The mortar is mixed with sand and water to the desired consistency. It is then applied to the rough concrete surface using a smooth trowel. This creates an even exterior finish that is both attractive and resistant to weather.

Concrete-based materials for providing an even exterior surface are widely known, and commonly used in the construction arts. For example, U.S. Pat. No. 4,222,785, issued Sep. 16, 1980, to Henderson, teaches a concrete-based material suitable for application to the exterior of a building. This particular mixture provides certain insulating characteristics.

U.S. Pat. No. 4,229,225, issued Oct. 21, 1980, to Kraszewski et al., teaches another concrete-based material suitable for application to the exterior of a building. This particular mixture includes:

20–60% cement;

30–70% inorganic or organic filler;

2–10% zirconium, hafnium, vanadium or cesium silicate fibers;

0.2–1% plasticizers for cement;

1–3% adhesive; and 0.1–0.5% water-repellent.

This above mixture provides certain water-repellent characteristics discussed therein.

U.S. Pat. No. 4,741,777, issued May 3, 1988, to Williams et al., teaches another concrete-based material suitable for a coat application to the exterior of a building. This particular mixture includes:

23% Portland cement;

68.55% sand;

6% Fly ash type F;

1% glass fiber, 1.25% vinyl acetate-ethylene co-polymer powder form;

0.15% sodium salts; and 0.05% defoamer or antifoam agent.

Still other related cement mixtures are taught by:

U.S. Pat. No. 5,690,729, issued Nov. 25, 1997, to Jones, Jr.;

U.S. Pat. No. 5,651,816, issued Jul. 29, 1997, to Kobayashi et al.;

U.S. Pat. No. 5,460,648, issued Oct. 24, 1995, to Walloch et al.;

U.S. Pat. No. 5,378,279, issued Jan. 3, 1995, to Conroy;

U.S. Pat. No. 4,746,552, issued May 24, 1988, to Tokumoto et al.;

U.S. Pat. No. 5,728,209, issued Mar. 17, 1998, to Bury et al.; and

U.S. Pat. No. 5,965,201, issued Oct. 12, 1999. Each of the above-identified patents are expressly incorporated herein by reference.

Despite the selection of additives and range of combinations heretofore available, the search for a combination of constituents that provides the "optimum" mixture continues. In many cases, the addition of a constituent to enhance one characteristic (e.g., workability) adversely affects or effects another characteristic (e.g., slump).

In the application of a coat mortar, the mortar's properties are especially critical. The mortar must form a strong bond with the underlying rough surface and at the same time provide an even exterior surface.

In addition, application conditions significantly affect a mortar's properties. Increased temperatures tend to accelerate the drying process and, in many mixtures, cause small cracks to form in the forging mortar. These are obviously undesirable, but very difficult to avoid with commercially available mixtures.

SUMMARY

It is an object of the invention to provide a concentrated mix to cover surfaces identified herein as concentrated one-coat mortar. The concentrated one-coat mortar is suitable for application in wide range of climactic conditions. It especially avoids the formation of cracks in the finished surface.

In one preferred embodiment of the invention, the concentrated one-coat mortar is provided for mixing with cement, sand and water; in another preferred embodiment of the invention, the concentrated one-coat mortar includes cement and is provided for mixing with sand and water; in another preferred embodiment of the invention, the concentrated one-coat mortar includes sand and is provided for mixing with cement and water.

It is a further object of the invention that the concentrated one-coat mortar should provide properties that include strong bonding to the underlying surface, impermeability to water but permeability to water vapor, acoustic and thermal insulation, and elasticity.

According to one preferred aspect of the invention, a concentrated one-coat mortar is especially suited to mix with sand and cement as may be available at the job site, and prevents cracking when applied in relatively high and low temperature conditions. The mortar is composed by weight of approximately 40% cement, 54% calcium carbonate (preferably controlled graining between 0.63–0.66 mm in the fine/thin part of the granularity; for then it would use from 20–25% of calcium carbonate; and 1.8–2 mm in the thick part of the granularity; for then it would use from 75–80% of calcium carbonate), 2.5% light sand, 0.6% hydrofuge agent, 1.8% cellulose fiber, 0.4% cellulose ether, and 0.5% dispersible pulverized resin.

According to further aspects of the invention, the preferred range of the composition varies within a range of +/−3% for the cement, +/−4% for the calcium carbonate, +/−0.2% for the sand, +/−0.04% for the hydrofuge agent, +/−0.04% for the cellulose fiber, +/−0.02% for the cellulose ether, and +/−0.02% for the dispersible pulverized resin.

According to still further aspects of the invention, the preferred range of the composition varies within a range of +/−12% for the Portland cement, +/−16% for the calcium carbonate, +5%/−1% for the sand, +1%/−0.6% for the hydrofuge agent, +3%/−0.8% for the cellulose fiber, +3%/−0.04% for the cellulose ether, and +1%/−0.5% for the dispersible pulverized resin.

According to a further aspect of the invention, the concentrated one-coat mortar does not include sand so that it is mixed in 1:1 proportion with sand (such as beach sand or silica) or pulverized aggregate (such as calcium carbonate) and water on site. Also, this concentration can be without cement so that the cement is added on site in to the desired consistency. In either case, the mix is prepared on-site in accordance with prevailing conditions.

According to a further aspect of the invention, the improved concentrated one-coat mortar uses sodium oleate for the hydrofuge agent. This provides the impermeability to water and permeability to water vapor.

According to another aspect of the invention, the improved concentrated one-coat mortar is applied to a rough concrete surface to form an even or textured exterior surface.

DETAILED DESCRIPTION

The present invention is a dry concentrated one-coat mortar composition formulated for application in a wide range of temperatures. The invention prevents the formation of cracks on the finished mortar surface. In one preferred embodiment, the mortar composition includes cement (preferably Portland, white type BL II), controlled graining calcium carbonate (preferably controlled graining, with 20–25% fine granulating of 0.63–0.66 mm; and 75–80% thick granulating of 1.8–2 mm), light sand or pulverized aggregate, hydrofuge agent (such as sodium oleate), natural cellulose fiber, natural cellulose ether and dispersible pulverized resin. The precise composition of preferred embodiments are set forth in further detail below.

The cement provides the bonding properties and functions as a glue. For one-coat concentrated mortar applications, this cement provides a harder exterior coat. The calcium carbonate with controlled granularity provides the different grain sizes that have two principal functions: first, it provides a better bonding between the cement and the light sand our pulverized aggregate because these function as rocks and this determines the hardness of the mortar; second, these different sized grains provide texture so that the forging mortar can be scratched with a tool. The texture is formed when these fine grains are scratched off of the last coat, leaving traces of a fossilized aspect. The sand is preferably light beach sand or light silica, the same as for the pulverized calcium carbonate. The hydrofuge is included in the mortar because it gives the impermeability to the water and the permeability to the water vapor. The natural cellulose fiber gives workability to the mortar. This, once it is mixed, is an absorbent material that retains water and humidity. It helps to prevent the formation of cracks. In applications where the mortar is pumped through a hose, the cellulose fiber acts as lubricant between the mortar and the hose. After approximately one month's time, the cellulose fiber disintegrates within the hardened mortar. When it disintegrates, it leaves holes in the mortar, which provide acoustic and thermal insulation properties. Cellulose ether is also used and performs the same function as the cellulose fiber and in addition, it controls the chemical's temperature reaction by not letting the cement get hot when it comes in contact with the water. This helps to prevent cracks. Finally, the dispersible pulverized resin enhances a number of properties. It helps to provide strong adherence, greater workability, greater module of elasticity, resists thermal expansion and contraction, and helps to reduce cracking.

The concentrated one-coat mortar composition is preferably packaged in 25, 55 and 100 pound bags. These are mixed on-site in 1:1 proportion with sand (e.g., common beach sand or light silica) or pulverized aggregate (e.g., marble dust or calcium carbonate). This composition is further mixed with water to obtain the desired consistency. The one-coat mortar is then applied to form an even or textured surface.

The composition is especially suited for application at higher temperatures above 80° Farenheit. The composition prevents even hairline cracks from forming in these conditions, and even above 95° Farenheit. The composition also is especially suited for application in high-humidity conditions, including tropical and near-tropical climates.

The specific percentages by weight of one preferred composition is set forth below, along with a most preferred range of percentage variation, and an alternative preferred range of percentage variation:

| Component | Content | 1st Range | 2nd Range |
|---|---|---|---|
| Cement (Preferably Portland, white, type BL II 52.5) | 40% | +/−3% | +/−12% |
| Controlled graining calcium carbonate | 54.2% | +/−4% | +/−16% |
| Light beach sand | 2.5% | +/−0.2% | +5%/−1% |
| Hydrofuge agent (sodium oleate) | 0.6% | +/−0.04% | +1%/−0.6% |
| Natural cellulose fiber | 1.8% | +/−0.04% | +3%/−0.8% |
| Cellulose ether | 0.4% | +/−0.02% | +3%/−0.4% |
| Dispersible pulverized Resin | 0.5% | +/−0.02% | +1%/−0.5% |

For brevity the above combinations are set forth in preferred ranges. Nonetheless, all combinations falling within the above-defined preferred ranges are included herein.

In another preferred embodiment, the concentrated one-coat mortar without sand is pre-mixed in 1:1 proportion with the sand or pulverized aggregate and provided ready-to-mix with water and use on site. This composition is preferably delivered in bulk.

In still another preferred embodiment, the concentrated one-coat mortar without cement is pre-mixed according to the required percentage with cement and water and provided ready-to-use on site.

In still another preferred embodiment, the concentrated one-coat mortar is provided without sand or cement for mixing on site in accordance with the prevailing conditions.

Although the invention has been described with reference to preferred embodiments, those skilled in the art will appreciate that many modifications are possible without departing from the scope of the invention. More specifically, although the invention has been described with reference to specific compositions and methods, equivalent compounds and steps may also be used. The following claims are intended to cover all such modifications and variations of the invention.

I claim:

1. A concentrated one-coat mortar especially suited to prevent cracking when applied in high and low temperature conditions, comprising by weight approximately:

40% cement;

54% calcium carbonate;

2.5% sand;

0.6% hydrofuge agent;

1.8% cellulose fiber;

0.4% cellulose ether; and 0.5% dispersible pulverized resin.

2. The concentrated one-coat mortar of claim 1, wherein the concentrated one-coat mortar is further mixed in 1:1 proportion with sand or pulverized aggregate and water.

3. An improved method of applying a concentrated one-coat mortar in high and low temperature conditions to avoid cracking comprising the steps of:

mixing by weight approximately 40% cement, 54% calcium carbonate, 2.5% sand, 0.6% hydrofuge agent, 1.8% cellulose fiber, 0.4% cellulose ether, and 0.5% dispersible pulverized resin to provide a mortar;

mixing by weight in 1:1 proportion the mortar with sand or pulverized aggregate and further mixing with water to a consistency for prepared mortar; and applying the prepared mortar to a rough concrete surface to form a finished exterior surface without cracks.

4. A method of making a concentrated one-coat mortar especially suited to avoid cracking in high and low temperature climates wherein the improvement comprises mixing the following components of the concentrated one-coat mortar by weight in approximately following proportions:

40%, within a range of +/−12%, cement;

54%, within a range of +/−16%, calcium carbonate;

2.5%, within a range of +5%/−1%, sand;

0.6%, within a range of +1%/−0.6%, hydrofuge agent;

1.8%, within a range of +3%/−0.8%, cellulose fiber; and 0.5%, within a range of +1%/−0.5%, dispersible pulverized resin.

5. The method of making a concentrated one-coat mortar of claim 4, wherein the step of mixing 0.6% hydrofuge agent comprises mixing 0.6% sodium oleate.

6. The method of making a concentrated one-coat-mortar of claim 4, wherein the step of mixing further comprises mixing 0.4%, within a range of +3%/−0.4% cellulose ether.

7. The method of making a concentrated one-coat mortar of claim 4, wherein the step of mixing further comprises mixing the components of the concentrated one-coat mortar by weight in approximately following proportions:

40%, within a range of +/−3%, cement;

54%, within a range of +/−4%, calcium carbonate;

2.5%, within a range of +/−0.2%, sand;

0.6%, within a range of +/−0.04%, hydrofuge agent;

1.8%, within a range of +/−0.04%, cellulose fiber; and 0.5%, within a range of +/−0.02%, dispersible pulverized resin.

8. A concentrated one-coat mortar especially suited to prevent cracking when applied in high and low temperature conditions, comprising by weight approximately:

90% calcium carbonate, having approximately 20–25% of 0.63–0.66 mm granularity and 75–80% of 1.8–2 mm granularity;

4% sand;

1% hydrofuge agent;

3% cellulose fiber;

1% cellulose ether; and

1% dispersible pulverized resin.

\* \* \* \* \*